(12) United States Patent
Senarath et al.

(10) Patent No.: US 9,107,174 B2
(45) Date of Patent: Aug. 11, 2015

(54) SYSTEMS AND METHODS FOR UPLINK POWER CONTROL AND SCHEDULING IN A WIRELESS NETWORK

(71) Applicant: FutureWei Technologies, Inc., Plano, TX (US)

(72) Inventors: Gamini Senarath, Ottawa (CA); Hang Zhang, Nepean (CA); Liqing Zhang, Ottawa (CA); Ho-Ting Cheng, Stittsville (CA)

(73) Assignee: Futurewei Technologies, Inc., Plano, TX (US)

( * ) Notice: Subject to any disclaimer, the term of this patent is extended or adjusted under 35 U.S.C. 154(b) by 225 days.

(21) Appl. No.: 13/650,658

(22) Filed: Oct. 12, 2012

(65) Prior Publication Data

US 2014/0105118 A1    Apr. 17, 2014

(51) Int. Cl.
| | | |
|---|---|---|
| *H04B 7/185* | (2006.01) | |
| *G01R 31/08* | (2006.01) | |
| *H04W 52/24* | (2009.01) | |
| *H04W 52/14* | (2009.01) | |
| *H04B 17/345* | (2015.01) | |
| *H04W 72/12* | (2009.01) | |

(52) U.S. Cl.
CPC ........... *H04W 52/244* (2013.01); *H04B 17/345* (2015.01); *H04W 52/146* (2013.01); *H04W 72/1231* (2013.01)

(58) Field of Classification Search
CPC .................................................. H04W 52/0238

USPC ................................... 370/252, 255, 317, 318
See application file for complete search history.

(56) References Cited

U.S. PATENT DOCUMENTS

| | | | |
|---|---|---|---|
| 8,798,073 B2* | 8/2014 | Lim et al. ................... | 370/395.4 |
| 2009/0137221 A1* | 5/2009 | Nanda et al. ................. | 455/296 |
| 2010/0099428 A1* | 4/2010 | Bhushan et al. ........... | 455/452.1 |
| 2010/0246524 A1* | 9/2010 | Hou et al. ...................... | 370/329 |
| 2011/0136533 A1 | 6/2011 | Senarath et al. | |
| 2011/0235598 A1* | 9/2011 | Hilborn ......................... | 370/329 |
| 2013/0130707 A1 | 5/2013 | Tarokh et al. | |
| 2014/0106802 A1 | 4/2014 | Cheng et al. | |

OTHER PUBLICATIONS

Castellanos, Carlos Ubeda, et al., "Performance of Uplink Fractional Power Control in UTRAN LTE," 2008 IEEE, pp. 2517-2521.

* cited by examiner

*Primary Examiner* — Redentor Pasia
(74) *Attorney, Agent, or Firm* — Slater & Matsil, L.L.P.

(57) ABSTRACT

Methods and systems for facilitating uplink power control (PC) and scheduling in a wireless network are provided. In one example, common interference patterns are obtained from long term channel statistics, and used to perform local PC and scheduling by distributed base stations (eNBs). In some implementations, the common interference patterns are obtained through statistical narrowing techniques that identify common ones out of a plurality of potential interference patterns. The common interference patterns may specify maximum interference thresholds and/or individual eNB-to-eNB interference thresholds which may govern the local PC and scheduling decisions of the distributed eNBs.

26 Claims, 14 Drawing Sheets

| $UL_i \backslash C_j$ | $C_1$ | $C_2$ | $C_3$ | $C_4$ | $C_5$ |
|---|---|---|---|---|---|
| $UL_1$ | NA | $ICl_1(C_2)$ | $ICl_1(C_3)$ | $ICl_1(C_4)$ | $ICl_1(C_5)$ |
| $UL_2$ | $ICl_2(C_1)$ | NA | $ICl_2(C_3)$ | $ICl_2(C_4)$ | $ICl_2(C_5)$ |
| $UL_3$ | $ICl_3(C_1)$ | $ICl_3(C_2)$ | NA | $ICl_3(C_4)$ | $ICl_3(C_5)$ |
| $UL_4$ | $ICl_4(C_1)$ | $ICl_4(C_2)$ | $ICl_4(C_3)$ | NA | $ICl_4(C_5)$ |
| $UL_5$ | $ICl_5(C_1)$ | $ICl_5(C_2)$ | $ICl_5(C_3)$ | $ICl_5(C_4)$ | NA |

FIG. 4

| $UL_i \backslash C_j$ | $C_1$ | $C_2$ | $C_3$ | $C_4$ | $C_5$ |
|---|---|---|---|---|---|
| $ICl_T$ | $ICl_T(C_1)$ | $ICl_T(C_2)$ | $ICl_T(C_3)$ | $ICl_T(C_4)$ | $ICl_T(C_4)$ |

FIG. 5

SYSTEMS AND METHODS FOR UPLINK POWER CONTROL AND SCHEDULING IN A WIRELESS NETWORK

TECHNICAL FIELD

The present invention relates generally to wireless communications, and, in particular embodiments, to optimizing uplink power control and scheduling in wireless communication systems.

BACKGROUND

Modern day wireless communications employ various techniques to regulate interference in an attempt to achieve desired levels of coverage and throughput. One significant challenge is mitigating inter-cell-interference (ICI) in the uplink communications channel, where link adaptation and channel estimation tends to be more complex due to the shifting of uplink transmission points from one resource block (RB) to another.

One technique for mitigating ICI in the uplink channel is to coordinate uplink power control (PC) and scheduling decisions amongst neighboring base stations (eNBs). Generally speaking, uplink PC regulates the transmit power for signals propagated in the uplink channel, while uplink scheduling regulates the allocation of uplink time-frequency resources to candidate user equipments (UEs). Conventionally, uplink power control (PC) and scheduling may be coordinated in a centralized fashion by delegating PC/scheduling decisions to a centralized controller. Specifically, the centralized controller may dynamically perform joint power control (JPC) and/or joint scheduling (JS) using an exhaustive search approach, thereby generating a global PC/scheduling solution that (at least theoretically) achieves optimal coverage and throughput in the wireless network. However, this centralized approach to uplink PC and scheduling may consume relatively large amounts of network resources (e.g., bandwidth, processing, etc.), particularly in large networks that include many eNBs. In some instances, networks having limited resources to devote to PC/scheduling may find centralized PC/scheduling to be impractical or infeasible. As such, more efficient alternatives for effectively mitigating ICI in uplink communication channels are desired.

SUMMARY OF THE INVENTION

Technical advantages are generally achieved, by preferred embodiments of the present invention which describe system and methods for optimizing downlink power control.

In accordance with an embodiment, a method for facilitating uplink power control (PC) and scheduling in a wireless network is provided. In this example, the method comprises generating potential interference patterns in accordance with long term channel statistics, statistically narrowing the potential interference patterns into one or more common interference patterns, and sending the one or more common interference patterns to an eNB for use when performing localized PC and scheduling. In accordance with another embodiment, a central controller is provided for performing the above mentioned method.

In accordance with yet another embodiment, an eNB of a wireless network is provided. In this example, the eNB is configured to receive a common interference pattern from a central controller, and performing localized scheduling and PC with respect to the common interference pattern. In embodiments, the localized scheduling and PC may be performed by identifying a plurality of individual eNB-to-eNB interference thresholds of the common interference pattern, and scheduling uplink transmissions by candidate UEs without exceeding those individual eNB-to-eNB interference thresholds.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a diagram of an embodiment of an interference pattern;

FIG. 5 illustrates a diagram of another embodiment of an interference pattern;

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure describe techniques for performing distributed uplink PC/scheduling in accordance with a common interference pattern. The common interference pattern may correspond to an approximation of optimal ICI levels in the network, and may be computed by a centralized controller using long term channel statistics provided by the eNBs. In embodiments, the centralized controller may obtain the common interference pattern by simulating joint power control (JPC) and joint scheduling (JS) on potential scheduling scenarios (e.g., likely traffic patterns, user distributions, etc.), which may be identified by analyzing the long term channel statistics. The common interference pattern may be provided statically or semi-statically to the eNBs, and may specify interference thresholds that the eNBs may use (in conjunction with path loss information of candidate UEs) to perform distributed/localized uplink PC and scheduling. For instance, the centralized controller may statically provide the common interference pattern to the eNBs by signaling the common interference pattern upon initialization of the network. In some embodiments, the common interference pattern may be updated in an aperiodic manner, such as when the network is re-initialized after an outage, or upon the addition/removal of an eNB (e.g., in which case the common interference pattern would change). In other embodiments, the centralized controller may provide updated/new common interference patterns to the eNBs in a semi-static manner by periodically updating the common interference pattern in accordance with an updating period. Performing distributed uplink PC/scheduling according to one or more aspects of this disclosure may achieve levels of coverage and throughput that rivals that achieved by conventional centralized techniques, while (at the same time) consuming significantly less network resources.

Figure 1:
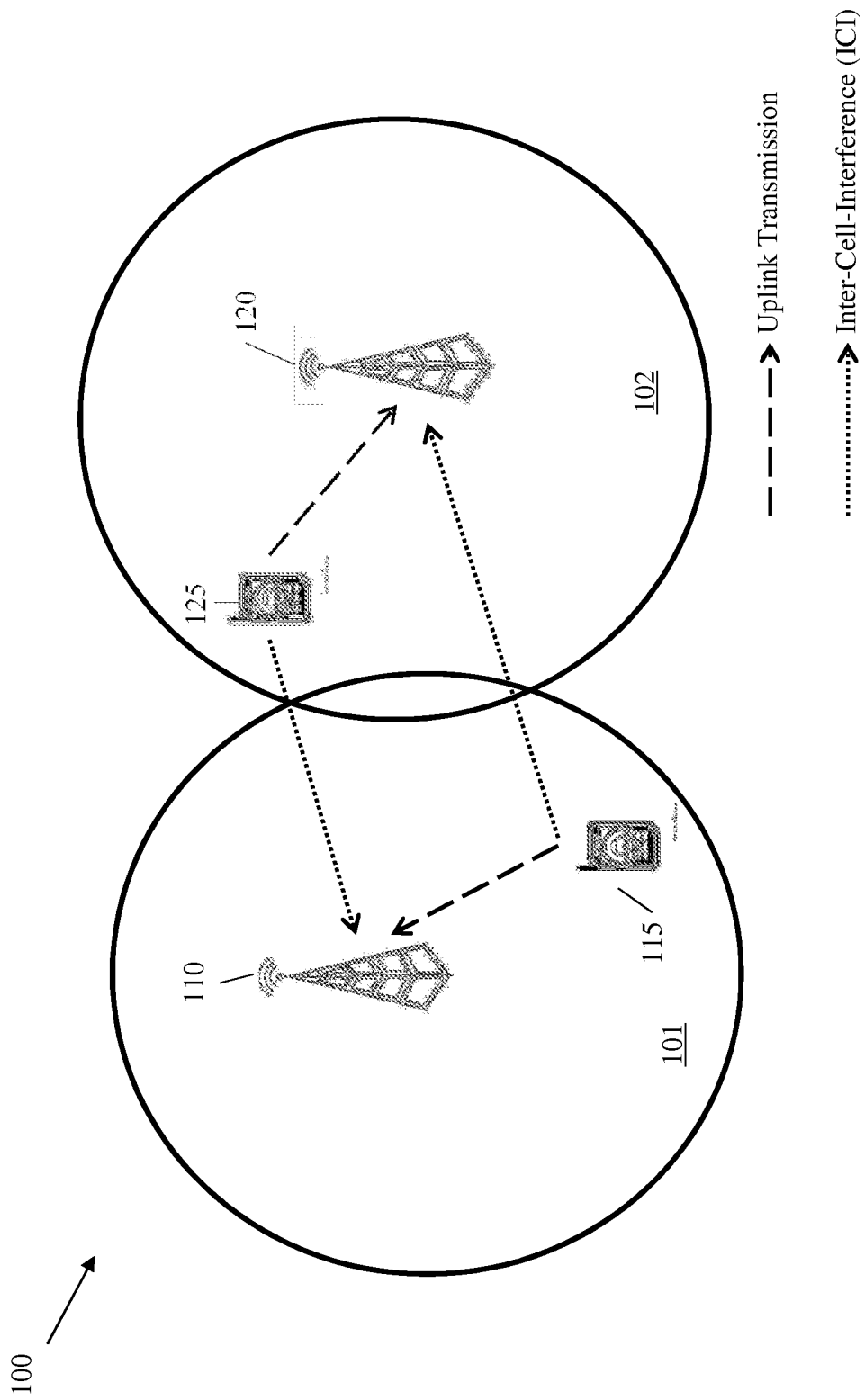
FIG. 1 illustrates a diagram of a wireless network architecture.

FIG. 1 illustrates a wireless network 100 comprising a plurality of cellular coverage areas (cells) 101, 102, within which wireless access is provided by a plurality eNBs 110, 120 (respectively). During the course of providing wireless access, the eNBs 110, 120 may schedule the UEs 115, 125 to perform uplink transmissions (dashed lines) in a common time-frequency resource (e.g., the same RB). The resulting uplink transmissions may interfere with one another, thereby producing ICI in the cells 101, 102. Specifically, the eNB 110 may observe interference from the UE 125 when receiving the uplink transmission from the UE 115, while the eNB 120 may observe interference from the UE 115 when receiving the uplink transmission from the UE 125. High levels of ICI may reduce coverage and throughput in the network 100, and consequently, techniques that effectively mitigate ICI may generally increase network performance.

Figure 2A:
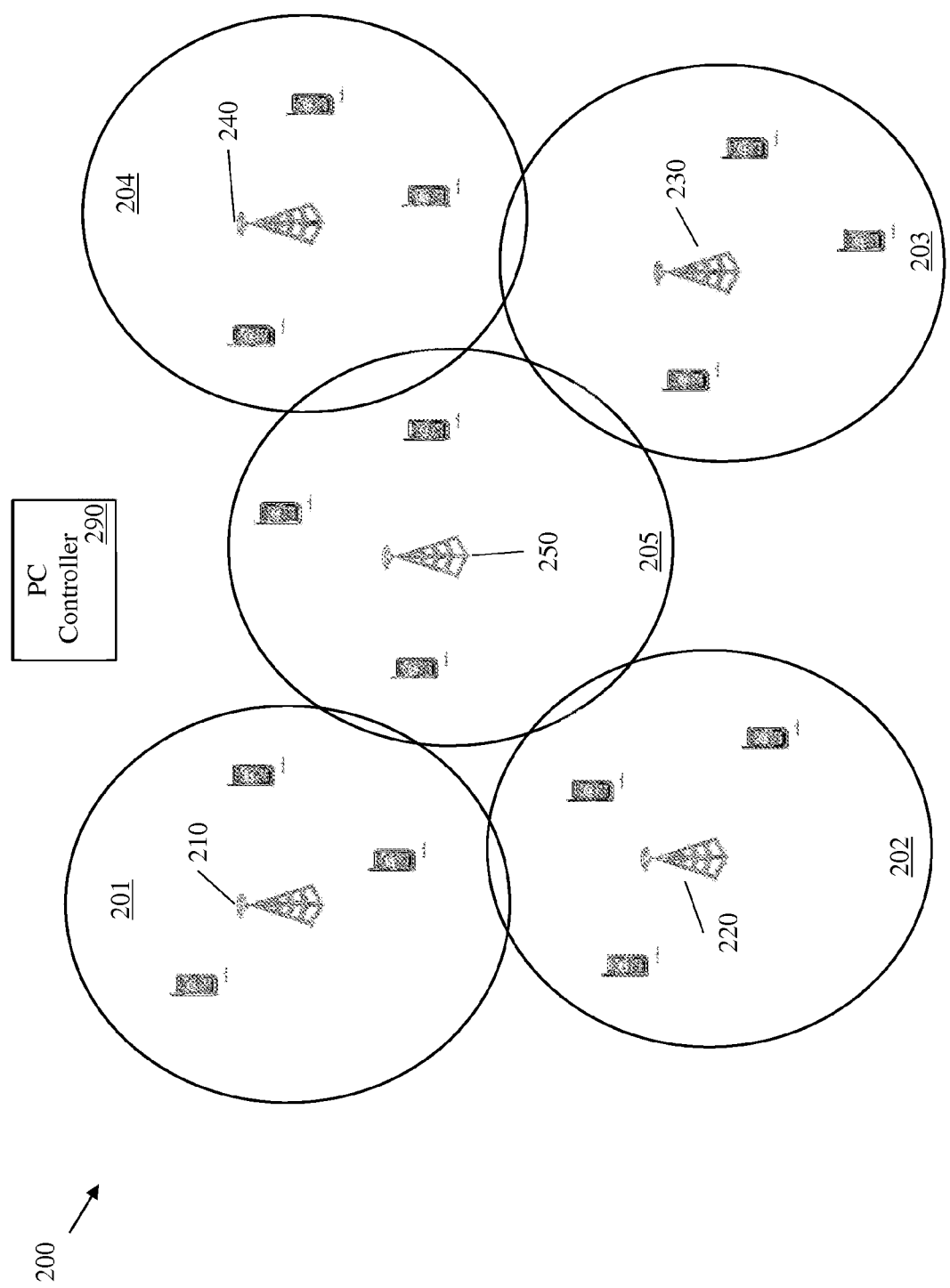
FIG. 2(a) illustrates a diagram of a scheduling scenario for a wireless network.

FIG. 2(a) illustrates a scheduling scenario for a network 200 that includes a plurality of cells 201-205. As shown, the cells 201-205 house a plurality of eNBs 210-250, which provide wireless access to a plurality of candidate UEs (not labeled). A candidate UE may represent any wireless device requesting uplink resources for performing uplink transmissions in the network 200. As shown in FIG. 2(a), various combinations of UEs could be scheduled to perform uplink transmissions in the cells 201-205 during a given RB, and hence a plurality of possible PC/scheduling solutions exist for the scheduling scenario illustrated in FIG. 2(b). Notably, the PC/scheduling solutions have different utilities, as each will produce different levels of coverage and throughput in the network 200.

To identify an optimal one of the plurality of PC/scheduling solutions, a centralized PC controller 290 may perform JPC/JS (e.g., using an exhaustive search or alternate technique) to estimate the utilities of each potential PC/scheduling solution. Subsequently the PC controller 290 may run a simulation of the optimal PC/scheduling solution on the given scheduling scenario, thereby obtaining a resulting interference pattern corresponding with that scenario. The interference pattern may specify ideal interference thresholds for each of the eNBs.

Figure 2B:
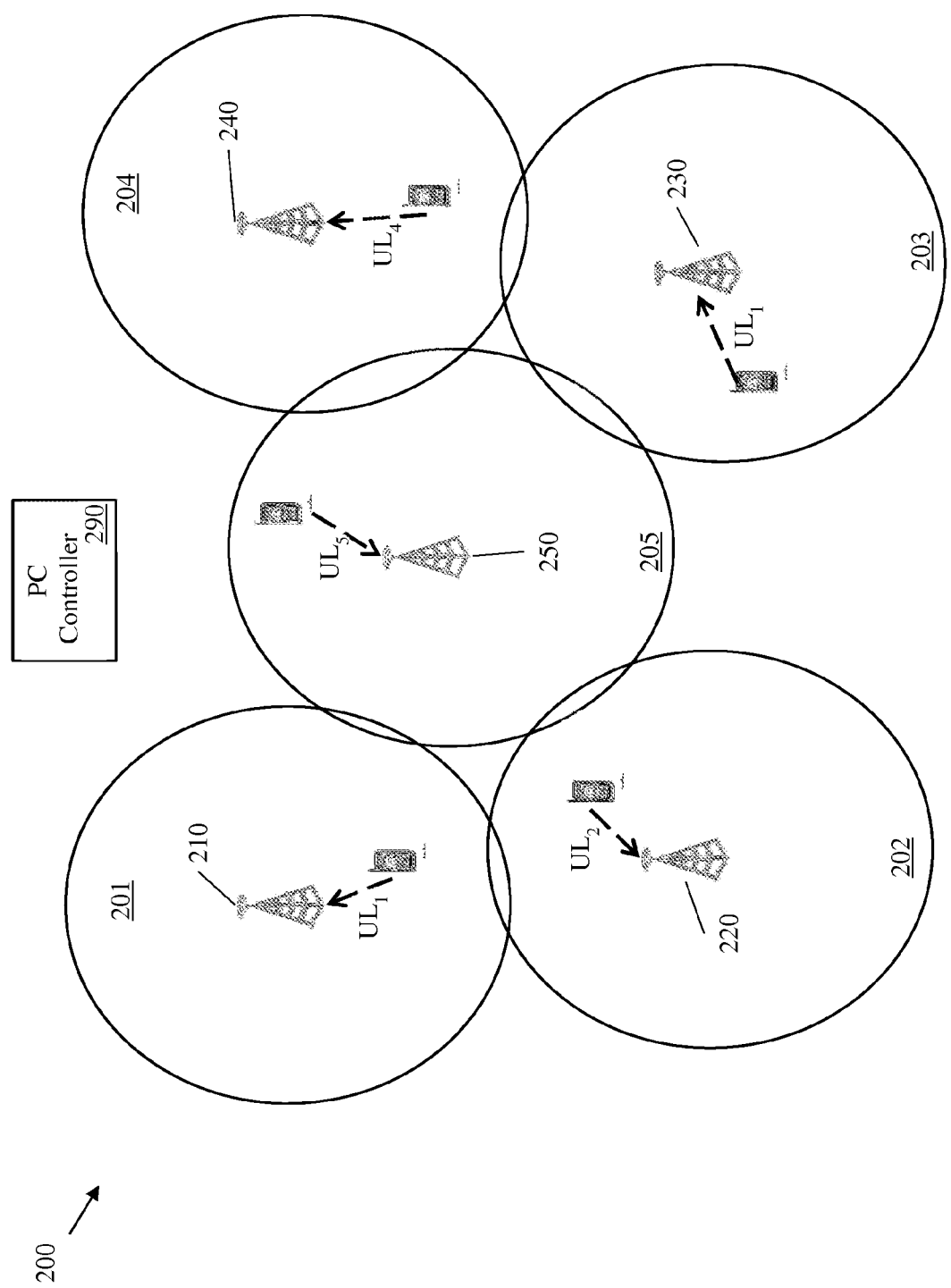
FIG. 2(b) illustrates a diagram of a simulated PC/scheduling solution for the scheduling scenario depicted in FIG. 2(a)
Figure 2C:
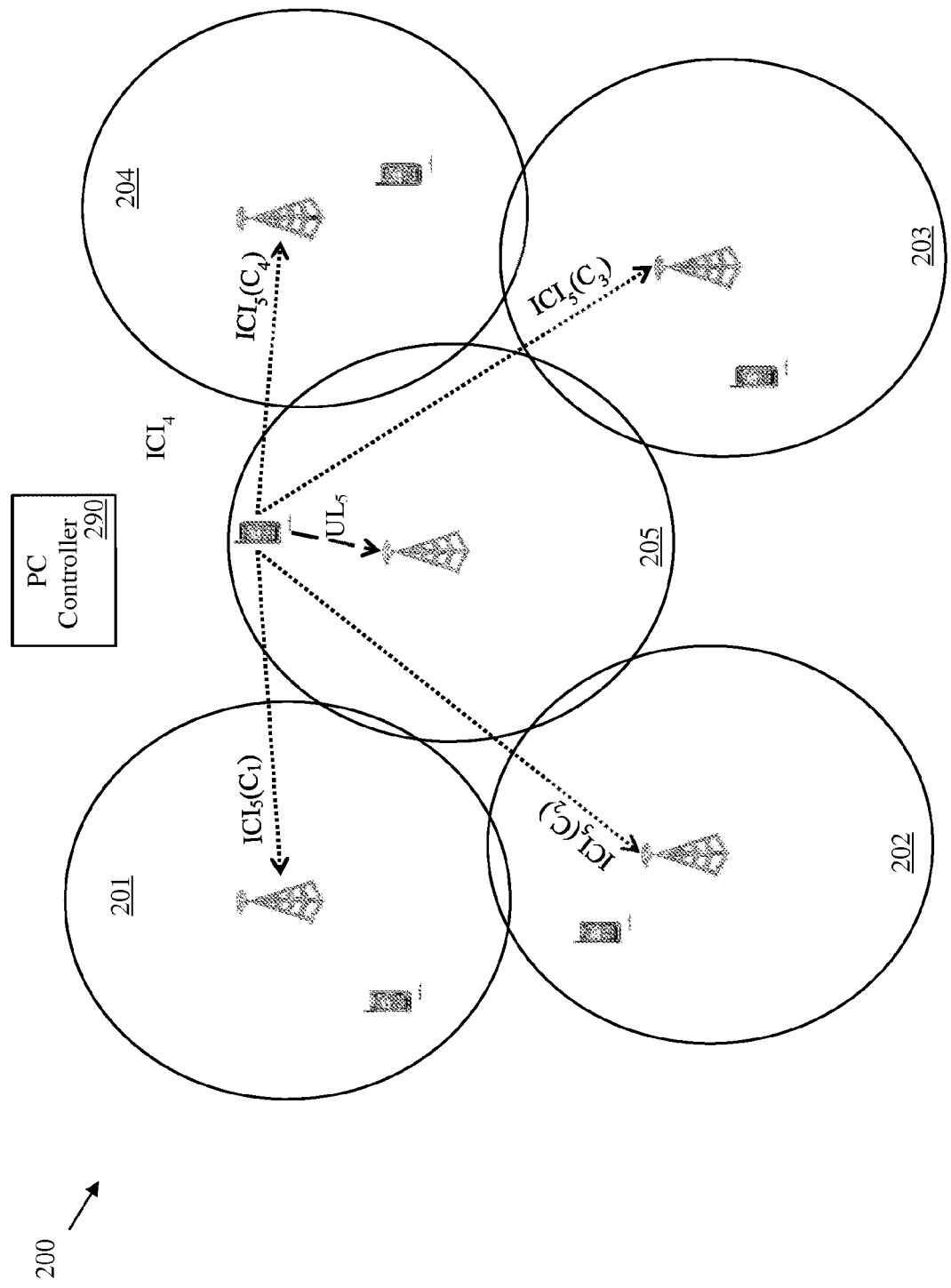
FIG. 2(c) illustrates a diagram of a set of interference components resulting from the simulated PC/scheduling solution depicted in FIG. 2(b)

FIG. 2(b) illustrates a simulated PC/scheduling solution for the scheduling situation shown in FIG. 2(a). As shown in FIG. 2(b), the simulated PC/scheduling solution includes the scheduling of a plurality of uplink transmissions [$UL_1$, $UL_2$, $UL_3$, $UL_4$, $UL_5$] at appropriate power levels in the cells 201-205 (respectively). Each of the uplink transmission $UL_1$-$UL_5$ may produce an interference component (e.g., an individual eNB-to-eNB interference threshold) in one or more of the neighboring cells 201-205. For instance, FIG. 2(c) illustrates the interference produced in the cells 201-204 as a result of the uplink transmission $UL_5$ in the cell 205. As shown, the uplink transmission $UL_5$ produces interference levels of $ICI_5(C_1)$ in cell 201, $ICI_5(C_2)$ in cell 202, $ICI_5(C_3)$ in cell 203, and $ICI_5(C_4)$ in cell 204.

Figure 2D:
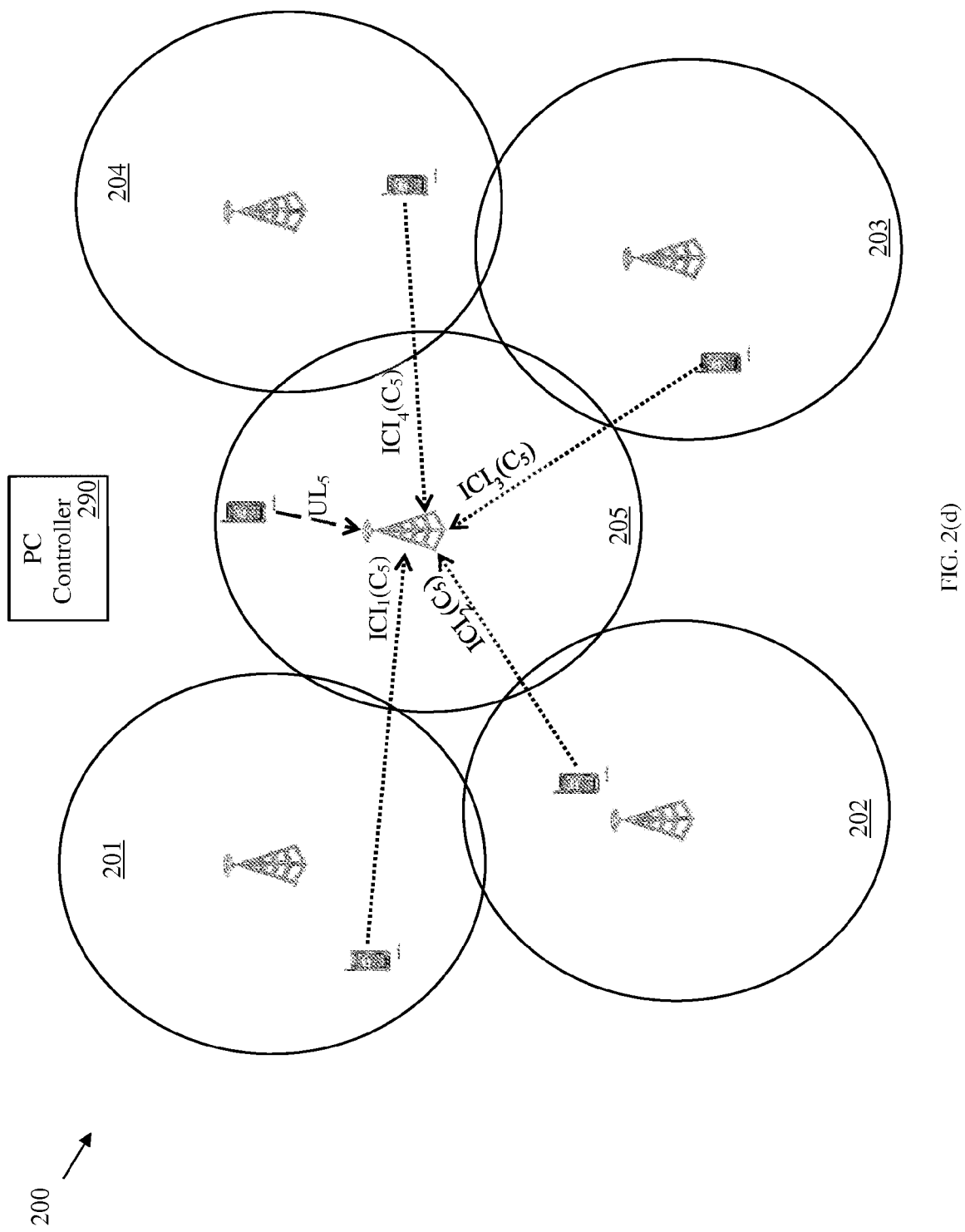
FIG. 2(d) illustrates a diagram of another set of interference components resulting from the simulated PC/scheduling solution depicted in FIG. 2(b)

Likewise, the total interference observed in a given one of the cells 201-205 may be a combination of the interference components resulting from uplink transmissions in the other cells 201-205. For instance, FIG. 2(d) illustrates the total interference observed in cell 205 as a result of uplink transmissions performed in the cells 201-204. As shown, the uplink signal ($UL_5$) in cell 205 is disrupted by a multi-component ICI, which includes the interference components [$ICI_1(C_5)$, $ICI_2(C_5)$, $ICI_3(C_5)$, $ICI_4(C_5)$] attributable to uplink transmissions in the cells 201-204. Notably, the uplink transmissions $UL_1$-$UL_4$ are not explicitly depicted in FIGS. 2(c)-(d) for purposes of clarity, but are nevertheless inherently present.

Figure 2E:
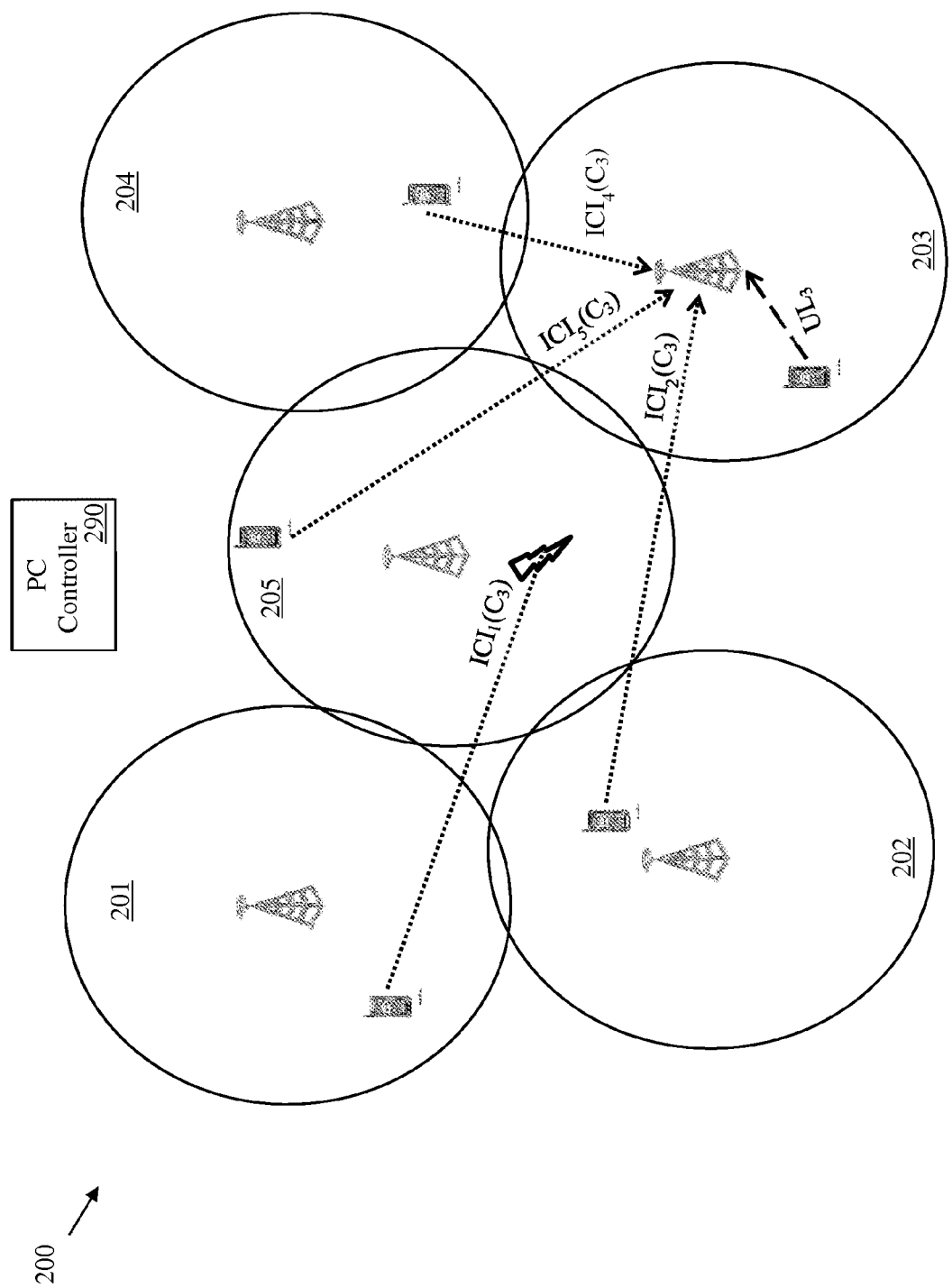
FIG. 2(e) illustrates a diagram of yet another set of interference components resulting from the simulated PC/scheduling solution depicted in FIG. 2(b)

Interestingly, the interference components (e.g., $ICI_1(C_5)$, $ICI_2(C_5)$, $ICI_3(C_5)$, $ICI_4(C_5)$) may have different magnitudes based on a number of factors (e.g., path loss, transmit power, etc.) of the corresponding uplink signals $UL_1$-$UL_4$. This concept is more clearly understood with reference to FIG. 2(e), which shows the effective interference observed in cell 203 as a result of uplink transmissions in the cells 201,202, 204, 205. As shown, the uplink transmission ($UL_3$) communicated in cell 203 is disrupted (at least partially) by a plurality of interference signals [$ICI_2(C_3)$, $ICI_4(C_3)$, $ICI_5(C_3)$] from uplink transmissions performed in each of the cells 202, 204, 205. However, the interference component $ICI_1(C_3)$ resulting from uplink transmissions in cell 201 may be attenuated significantly and/or completely dissipated before reaching cell 203, and therefore may produce a negligible amount of interference in the cell 203. Notably, the uplink transmissions $UL_1$, $UL_2$, $UL_3$, $UL_4$ are not explicitly depicted in FIG. 2(e) for purposes of clarity, but are nevertheless inherently present.

Figure 3:
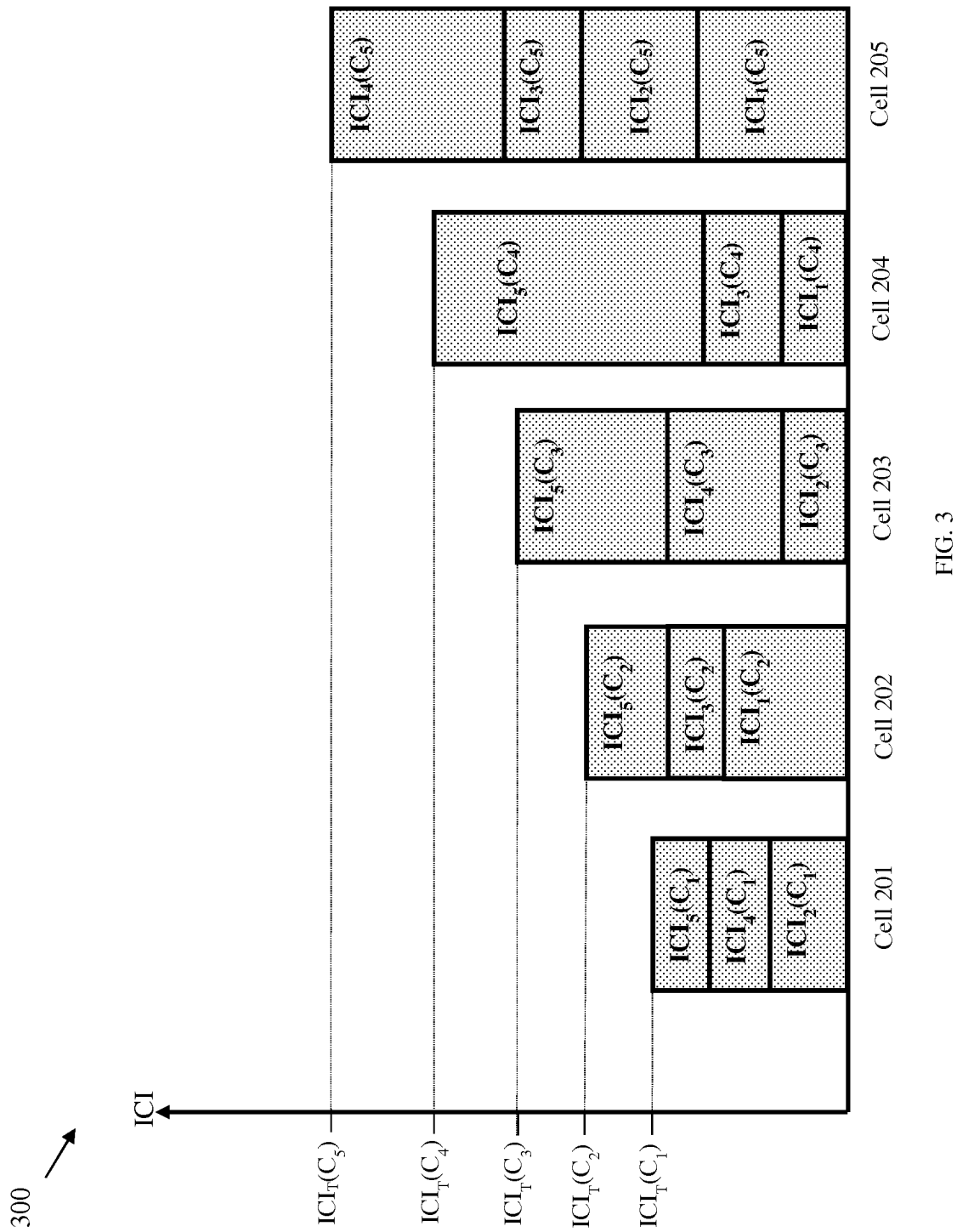
FIG. 3 illustrates a graph of total interference thresholds resulting from the simulated PC/scheduling solution depicted in FIG. 2(b)
Figure 6A:
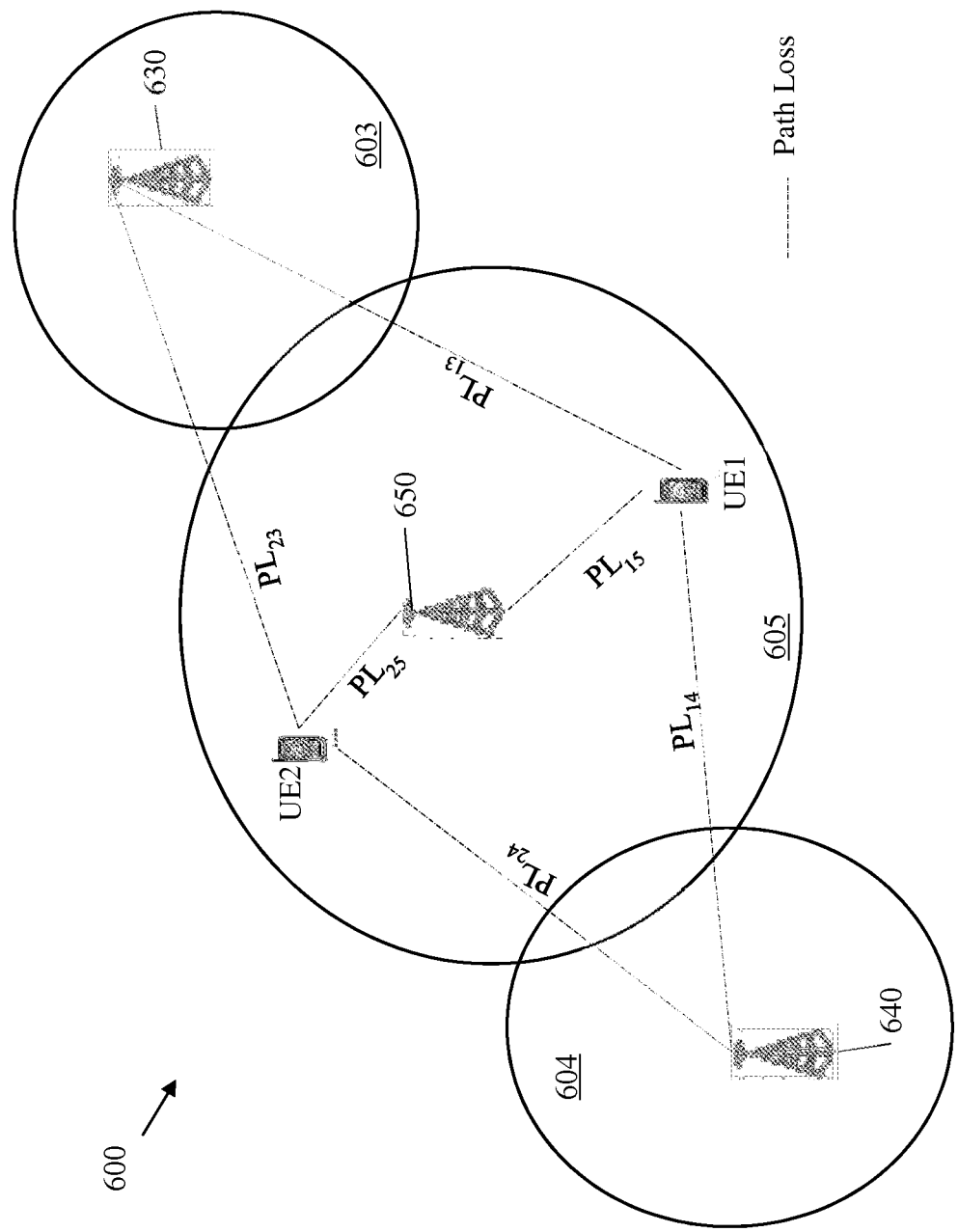
FIG. 6(a) illustrates a diagram of path loss characteristics in a wireless network.
Figure 6B:
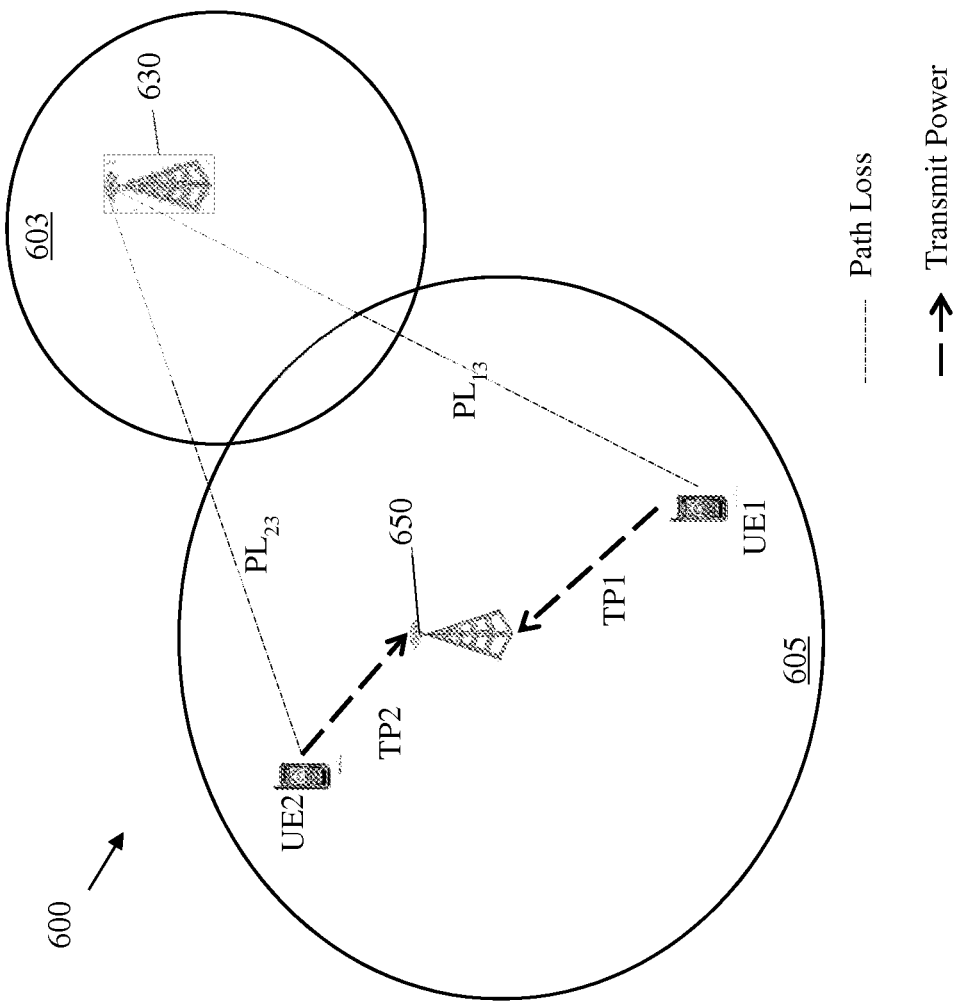
FIG. 6(b) illustrates a diagram of some estimated interference levels projected to result from potential scheduling decisions.
Figure 6B:
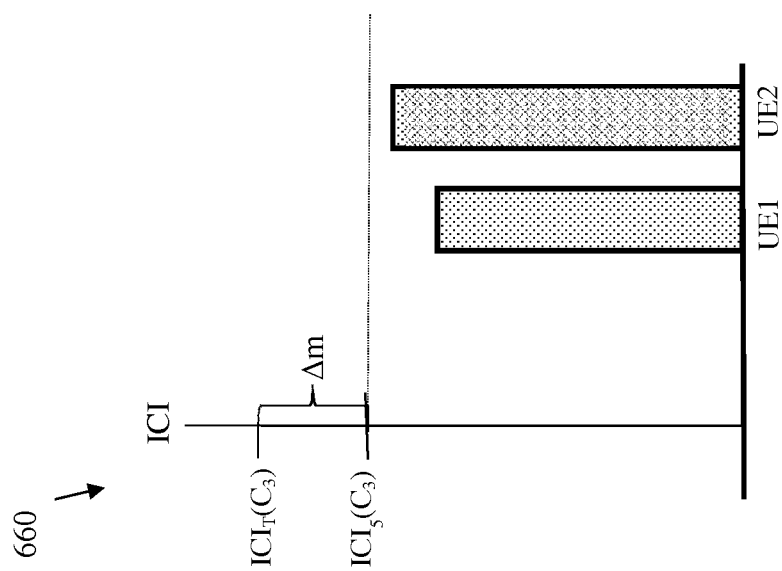
Figure 6C:
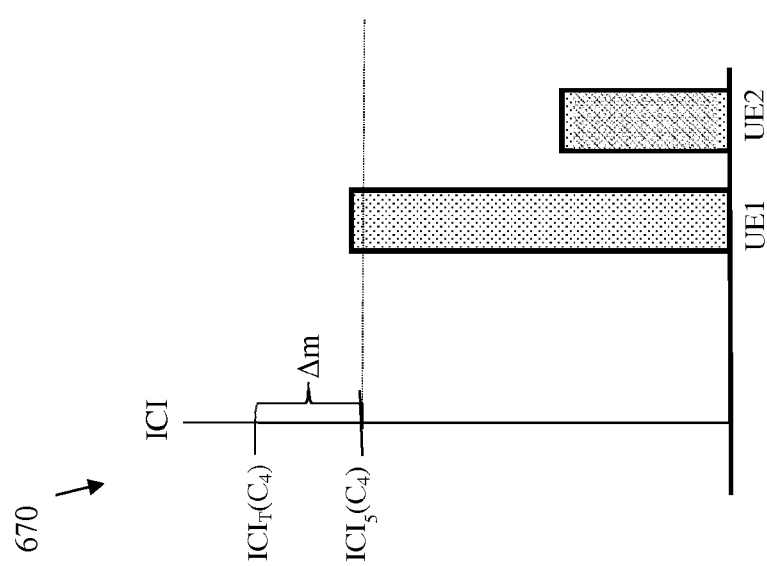
FIG. 6(c) illustrates a diagram of other estimated interference levels projected to result from potential scheduling decisions.
Figure 6C:
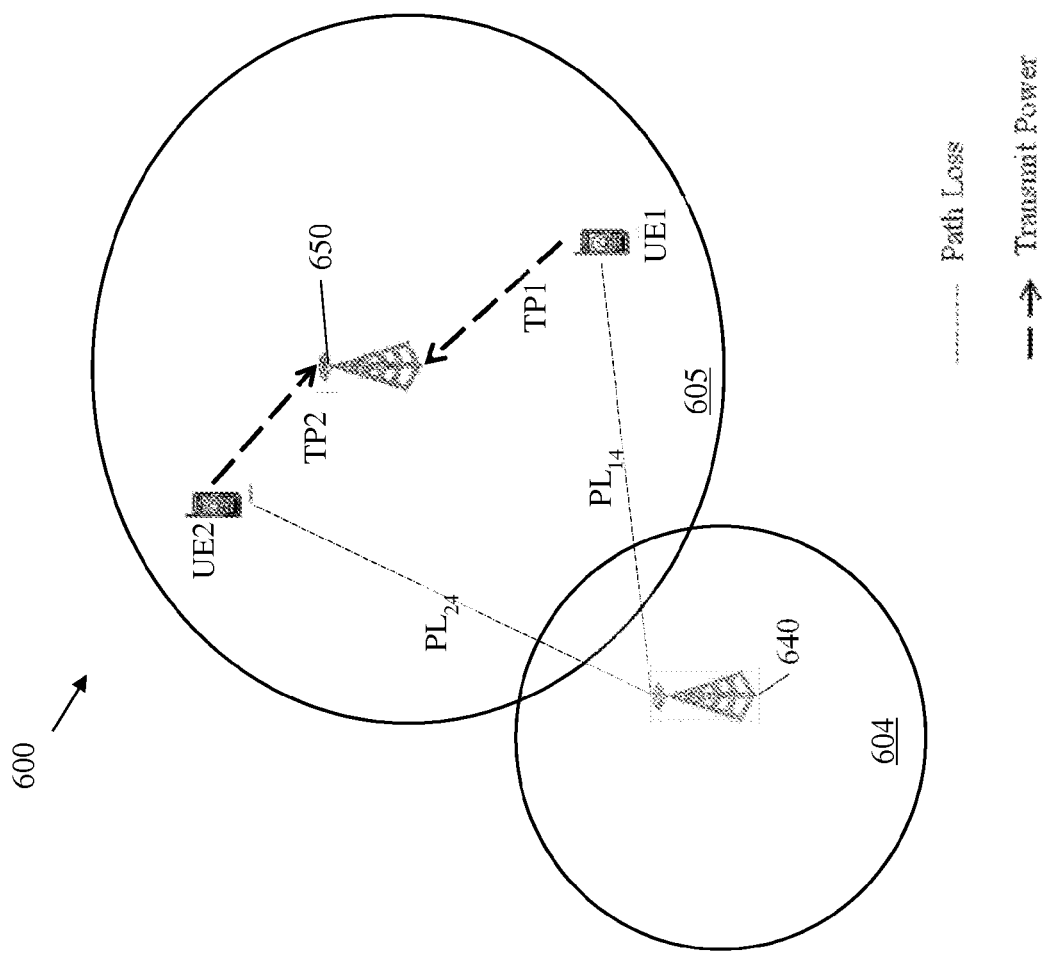

FIG. 3 illustrates a graph 300 of the interference produced in the network 200 as a result of the optimal PC/scheduling solution depicted in FIG. 2(a). As shown, the graph shows total interference thresholds [$ICI_T(C_1)$, $ICI_T(C_2)$, $ICI_T(C_3)$, $ICI_T(C_4)$, $ICI_T(C_5)$] in the cells 201-205 as being the sum of the respective interference components (e.g., $\Sigma_{i=1}^{i=x} ICI_i(C_x)$) from neighboring cells. For instance, the total interference threshold $ICI_T(C_5)$ is composed of component thresholds [$ICI_1(C_5)$, $ICI_2(C_5)$, $ICI_3(C_5)$, $ICI_4(C_5)$]. Notably, some of the uplink transmissions may produce only negligible amounts of interference in one or more of the neighboring cells. For instance, the total interference threshold for cell 203 $ICI_T(C_3)$ does not include an interference component from cell 201 (e.g., no $ICI_1(C_3)$), which indicates that the uplink transmission in cell 201 produces only negligible interference in cell 203.

For a given scheduling scenario (e.g., such as that in FIG. 2(a)), it may generally be assumed that network performance will not be significantly reduced so long as the scheduling/PC decisions do not collectively produce an effective amount of interference that exceeds the total interference thresholds resulting from the optimal PC/scheduling solution. In other words, the network performance of the network 200 may be close to optimal so long as the total interference thresholds [$ICI_T(C_1)$, $ICI_T(C_2)$, $ICI_T(C_3)$, $ICI_T(C_4)$, $ICI_T(C_5)$] are not exceeded. As such, an interference pattern resulting from simulating an optimal JPC/JS solution for a common scheduling scenario may be used to effectively set scheduling rules (e.g., interference thresholds) during distributed PC/scheduling.

FIG. 4 illustrates an interference pattern 400 as may result from simulating the optimal PC/scheduling solution depicted in FIG. 2(b). As shown, the interference pattern 400 comprises a plurality of rows representing the uplink signals $UL_1$-$UL_5$ and a plurality of columns representing the cells 201-205 (denoted as $C_1$-$C_5$, respectively), with the resulting cross-sections representing the corresponding individual eNB-to-eNB interference thresholds $ICI_i(C_j)$. Notably, the individual eNB-to-eNB interference thresholds $ICI_i(C_j)$ represent the maximum allowed interference observed in a given cell (Cj) as would result from a scheduled uplink transmission ($UL_i$). For instance, the individual interference threshold $ICI_3(C_5)$ corresponds to the maximum amount of interference occurring in cell 205 as a result of the scheduled transmission $UL_3$ made by the eNB 230. Hence, the eNBs 230 may view the set of interference thresholds [$ICI_3(C_1)$, $ICI_3(C_2)ICI_3(C_4)$ $ICI_3(C_5)$] as effective rules or limitations when performing local scheduling and PC for the uplink transmission $UL_3$. The other eNBs 210-220 and 240-250 may do the same.

From an elementary perspective, a given total interference threshold [$ICI_T(C_x)$] may be approximately equal to the sum of the interference components attributable to uplink transmissions in neighboring cells, e.g., $ICI_T(C_x) \approx \Sigma_{i=1}^{i \neq x} ICI_i(C_x)$. However, this assumes that the interference components [$ICI_i(C_x)$, $ICI_{i+1}(C_x)$, etc.) interact with one another in a purely constructive manner, and ignores various signal characteristics that may cause the total interference threshold $ICI_T(C_x)$ experienced in a given cell to be less than the sum of the interference components attributable to neighboring cells. For instance, a first interference component for a given cell (e.g., $ICI_1(C_x)$) may interfere with a second interference component for the given cell (e.g., $ICI_2(C_x)$) in a destructive manner, such that the total interference experienced in a cell is less than the sum of the interference signals, e.g., $ICI_T(C_x)] < \Sigma_{i=1}^{4} ICI_i$. Additionally, and as a practical matter, it may be unlikely that each of the neighboring eNBs will schedule transmission that max out their individual eNB-to-eNB interference threshold, which results in the observed amount of interference in a given cell being significantly less than total interference threshold $ICI_T(C_x)$. As such, strictly adhering to the individual eNB-to-eNB interference thresholds may underutilize network resources.

Further, computation and/or communication of the individual eNB-to-eNB interference thresholds may prove difficult or cumbersome in large networks. For instance, a network/cluster including, say, 57 cells would generate an interference pattern comprising a 57×57 matrix. Such a large interference pattern may consume relatively large amounts of processing/backlink resources, as well as introduce complexity into optional statistical narrowing techniques applied by the central controller (discussed in greater detail below).

To address these and other issues, an interference pattern may be adapted to include only a total interference thresholds (i.e., $ICI_T(C_x)$) for each cell, which may be adjusted by the eNBs upon reception to obtain their effective individual eNB-to-eNB interference thresholds. Notably, effective individual eNB-to-eNB interference thresholds may be similar to the pre-defined individual eNB-to-eNB interference thresholds discussed above, except that effective individual eNB-to-eNB interference thresholds may be computed by reducing the total interference thresholds (i.e., $ICI_T(C_x)$ by a margin (while pre-defined individual eNB-to-eNB interference thresholds may be communicated by the central controller). Unless otherwise stated, the term individual eNB-to-eNB interference thresholds may refer to both pre-defined individual eNB-to-eNB interference thresholds and effective individual eNB-to-eNB interference thresholds. FIG. 5 illustrates an interference pattern 500 as may result from simulating the optimal PC/scheduling solution depicted in FIG. 2(b). As shown, the interference pattern 500 includes a plurality of total interference thresholds [$ICI_T(C_1)$, $ICI_T(C_2)$, $ICI_T(C_3)$, $ICI_T(C_4)$, $ICI_T(C_5)$] for the cells 201-205. A total interference threshold $ICI_T(C_x)$ of a given cell ($C_x$) may be adjusted by neighboring eNBs to identify their effective individual eNB-to-eNB interference thresholds. For instance, a given eNB may reduce a given interference $ICI_T(C_x)$ by a fixed or variable margin (e.g., $\Delta m$) to obtain an effective individual eNB-to-eNB interference threshold. In one embodiment, the margin ($\Delta m$) may be fixed at about six decibels (6 dBs). In other embodiments, the margin ($\Delta m$) may be variable, and may depend on a variety of factors (e.g., the proximity of the interference producing cell to the interference observing cell, a detected amount of temporal fading, etc.). The effective individual eNB-to-eNB interference thresholds (e.g., which are achieved by adjusting the total interference threshold $ICI_T(C_x)$ by a fixed or variable margin) may achieve a more-efficient utilization of network resources than strict adherence to individual eNB-to-eNB interference thresholds that are pre-defined by a centralized controller.

Upon identifying a set of individual eNB-to-eNB interference thresholds (effective, pre-defined, or otherwise), the eNB may determine path loss characteristics associated with candidate UEs. These path loss characteristics may be used in conjunction with the set of effective individual eNB-to-eNB interference thresholds to perform localized PC/scheduling. FIG. 6 illustrates a network 600 comprising a plurality of cells 603-605 housing a plurality of eNBs 630-650. The eNB 650 may be in the process of performing local PC/scheduling according to an interference pattern that specifies interference thresholds for the cells 603-604. Notably, localized PC and scheduling may include various other actions beyond selection of a transmit power level and/or assignment of time-frequency resources, such as Modulation Coding Scheme (MCS) adaptation, pre-coding, antenna direction beamwidth changes, etc. Under such schemes, local scheduling may still be performed with local pre-coding or antenna direction selection to satisfy interference constraints. An exception may exist when two eNBs perform soft combining for a user, in which case the respective ICI thresholds may be ignored by the two eNBs.

Specifically, the eNBs 650 may have the option of scheduling a first candidate UE (UE1) or a second candidate UE (UE2) to a given RB. The eNBs 650 may first learn the path loss characteristics ($PL_{13}$, $PL_{14}$, $PL_{15}$, $PL_{23}$, $PL_{24}$, $PL_{25}$) corresponding to the UE1 and UE2 using a variety of methods (e.g., probe signaling, etc.). Specifically, $PL_{13}$ may represent the path loss between UE1 and eNB 630, $PL_{14}$ may represent the path loss between UE1 and eNB 640, $PL_{15}$ may represent the path loss between UE1 and eNB 650, $PL_{23}$ may represent the path loss between UE2 and eNB 630, $PL_{24}$ may represent the path loss between UE2 and eNB 640, $PL_{25}$ may represent the path loss between UE2 and eNB 650. The $PL_{15}$ and $PL_{25}$ may be used to determine the transmit power levels (TP1 and TP2, respectively) required for the UE1 and UE2 to achieve a desired data-rate. Thereafter, the transmit power levels (TP1 and TP2) may be used in conjunction with the path loss characteristics corresponding to the eNBs 630-640 ($PL_{13}$, $PL_{14}$, $PL_{23}$, $PL_{24}$) to determine whether scheduling either of the UE1 or the UE2 would violate a scheduling rule, e.g., whether the effective ICI produced would exceed either one of the interference thresholds $ICI_5(C_3)$ or $ICI_5(C_4)$ the cells 603-604.

FIG. 6(*b*) illustrates a graph 660 of the estimated interference in cell 603 as projected to result from scheduling UE1 or UE2 to perform an uplink transmission in the cell 605. As shown, scheduling either UE1 or UE2 would not produce a level of interference that exceeds the individual eNB-to-eNB interference threshold ($ICI_5(C_3)$). FIG. 6(*c*) illustrates a graph 670 of the estimated interference in cell 604 as projected to result from scheduling UE1 or UE2 to perform an uplink transmission in the cell 605. As shown, scheduling UE1 would produce a level of interference that exceeds the individual eNB-to-eNB interference threshold ($ICI_5(C_4)$), while scheduling UE2 would not produce a level of interference that exceeds the individual eNB-to-eNB interference threshold ($ICI_5(C_4)$). As such, UE1 would be classified as unsuitable for scheduling, while UE2 would be classified as suitable for scheduling.

In one embodiment, the individual eNB-to-eNB interference thresholds $ICI_5(C_3)$ and $ICI_5(C_4)$ may be specified explicitly by the interference pattern communicated by a central controller. In other embodiments, the individual eNB-to-eNB interference thresholds $ICI_5(C_3)$ and $ICI_5(C_4)$ may be obtained by adjusting total interference thresholds $ICI_7(C_3)$ and $ICI_7(C_4)$ by a margin ($\Delta m$).

Figure 7:
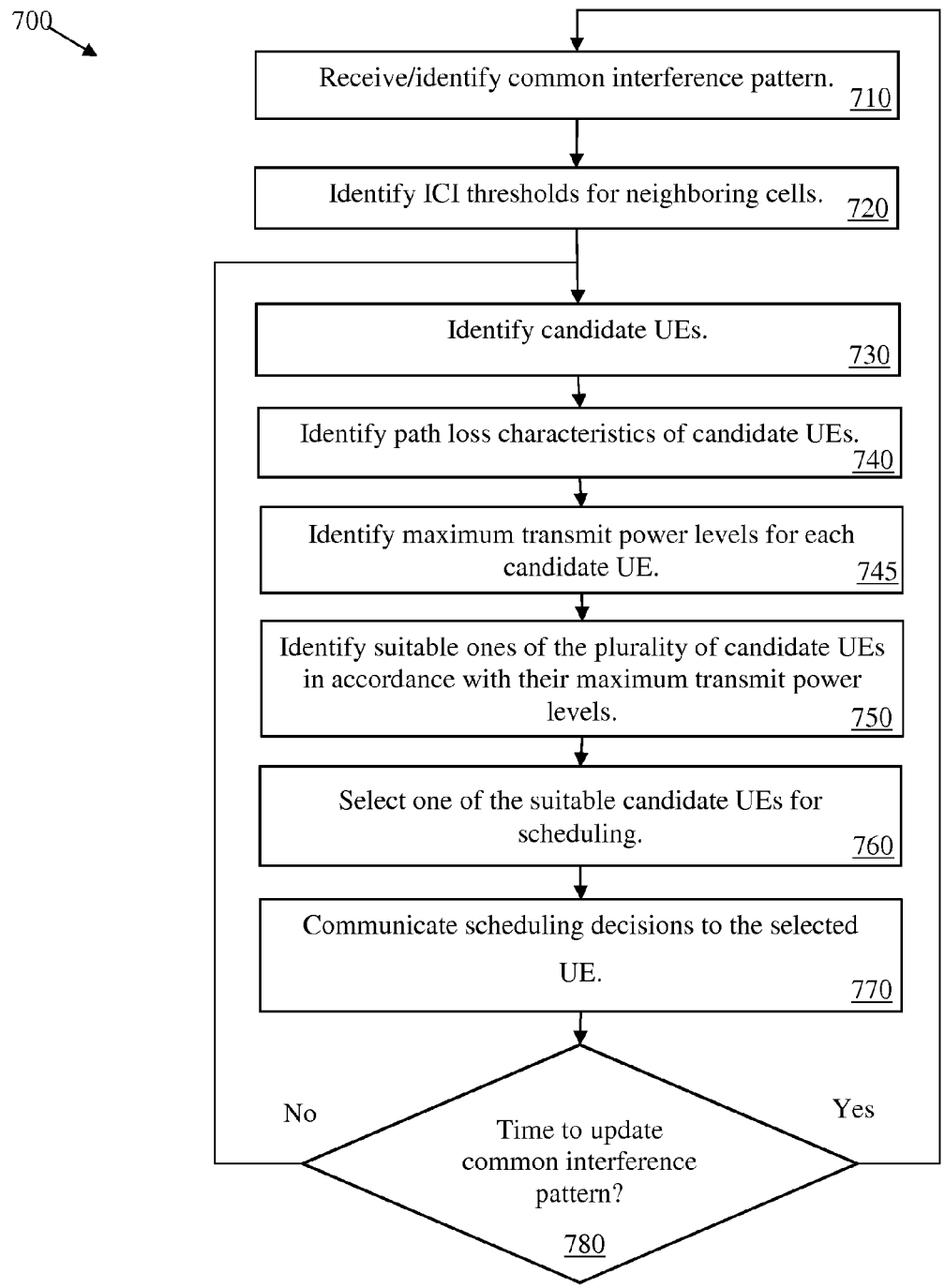
FIG. 7 illustrates a flowchart of method for performing distributed PC and scheduling in accordance with a common interference pattern.

FIG. 7 illustrates a method 700 for performing distributed PC and scheduling in accordance with a common interference pattern. The method 700 may begin at step 710, where an eNB may receive a common interference pattern from a central controller. In an alternative embodiment, the eNB may compute a common interference pattern using sample points received from a central controller. Next, the method 700 may proceed to step 720, where the eNB may identify individual eNB-to-eNB interference thresholds for one or more of the neighboring cells, e.g., $[ICI_x(C_i), ICI_x(C_{i+1}), \ldots]$ (where $i \neq x$). In one embodiment, the individual eNB-to-eNB interference thresholds may be explicitly specified by the interference pattern. In other embodiments, the individual eNB-to-eNB interference thresholds may be computed by adjusting the total interference thresholds (e.g., as specified by the interference pattern) by an appropriate margin. Thereafter, the method 700 may proceed to step 730, where the eNB may identify candidate UEs (e.g., UEs requesting the allocation of uplink resources). Thereafter, the method 700 may proceed to step 740, where the eNB may identify path loss characteristics corresponding to the candidate UEs. These path loss characteristics may include a path loss from each candidate UE to each neighboring eNB, and may be determined in a variety of ways (e.g., through pilot signaling). In some embodiments, some of the path loss characteristics may be communicated by neighboring eNBs or a PC controller via a backhaul connection. In the same or other embodiments, some or all of the path loss characteristics may be communicated via the candidate UEs via a control channel.

Next, the method 700 may proceed to step 745, where the maximum transmit power for each candidate UE is found. The maximum transmit power level may correspond to the highest transmit power level that does not produce interference in excess of the ICI thresholds, and may be determined in accordance with, inter alia, path loss characteristics. Thereafter, the method 700 may proceed to step 750, where suitable candidate UEs may be identified in accordance with their maximum transmit power levels. Specifically, the maximum transmit power level for some candidate UEs may be so low as to prevent the UE from engaging in a meaningful communication (e.g., from achieving a minimum bit-rate needed for satisfactory throughput). In such embodiments, these candidate UEs may be eliminated from consideration (e.g., classified as unsuitable). For instance, the UE1 (in network 600) would be classified as unsuitable, as the amount of interference produced from the UE1's uplink transmission would exceed the interference threshold $ICI_5(C_4)$ even for a small transmit power level. However, UE2 (in network 600) would be classified as suitable, as the amount of interference produced from the UE2's uplink transmission would not exceed either of the interference thresholds $ICI_5(C_3)$ or $ICI_5(C_4)$ for a reasonable transmit power. Thereafter, the method 700 may proceed to step 760, where the instant eNB may select one of the suitable candidate UEs for scheduling. In an embodiment, the selection may be performed to maximize a utility, or in accordance with some fairness computation. For this purpose, the expected data rate could be evaluated with knowledge of the allowed maximum transmit power, the path loss to serving base station, the expected interference to the serving base station, or combinations thereof. Thereafter, the expected utility could be evaluated in accordance with the past throughput. Next, the method 700 may proceed to step 770, where the instant eNB may communicate the scheduling decision to the selected UE. Finally, the method 700 may proceed to step 780, where the instant eNB may determine whether or not it is time to update the common interference pattern. In embodiments, this determination may depend on whether an updated interference pattern has been received from the central controller. In the same or other embodiments, a sequence of common interference patterns may be used in a pre-defined order. For instance, two or more interference patterns may be used in a round robin (or alternate fashion). If it is time to update the common interference pattern, then the method 700 may revert back to step 710. If is not time to update the common interference pattern, then the method 700 may repeat steps 730-780 until it is time to update the interference pattern.

Figure 8:
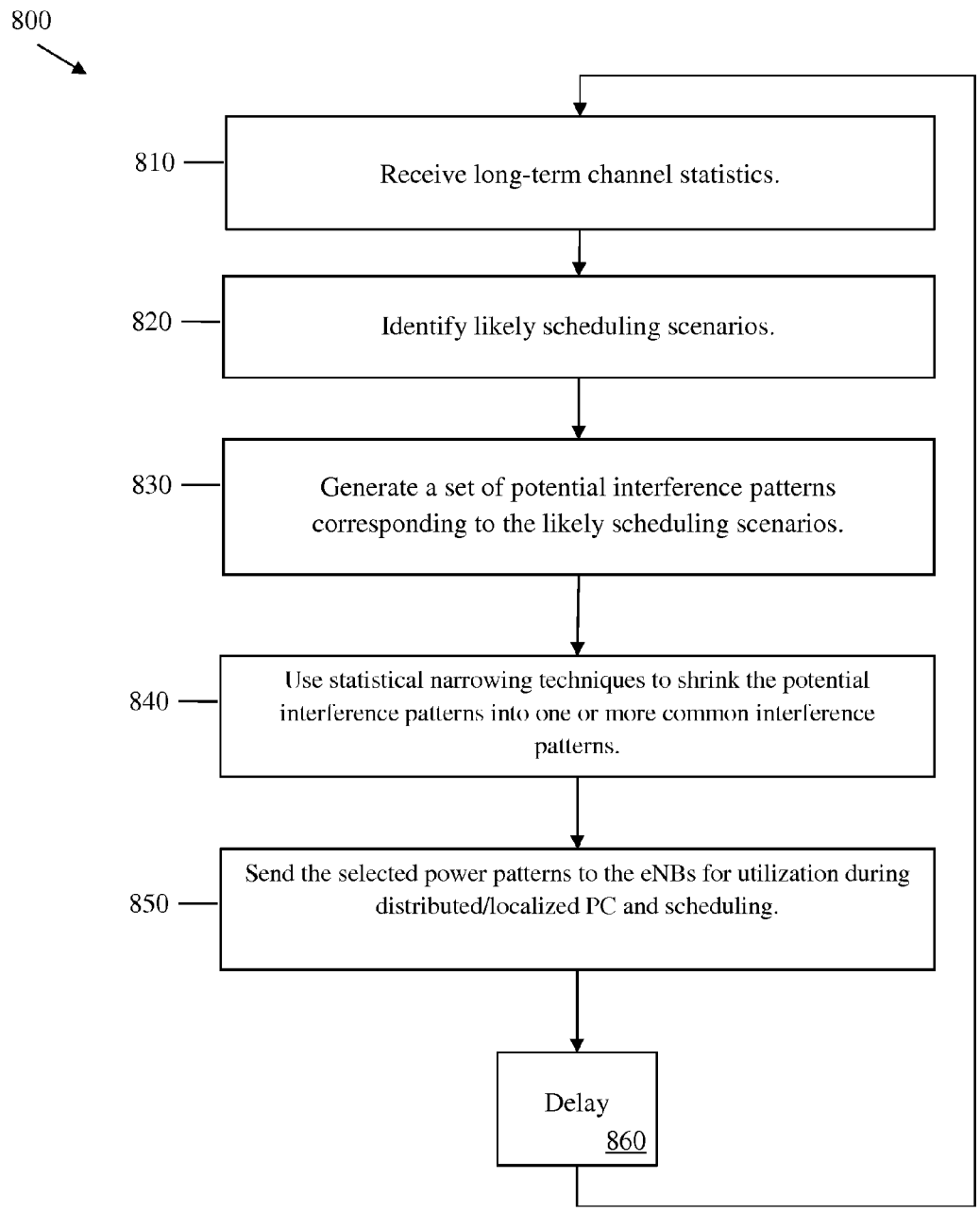
FIG. 8 illustrates a flowchart of a method for obtaining a common interference pattern.

FIG. 8 illustrates a method 800 for generating a common interference pattern for a network or cluster of eNBs. The method 800 begins at step 810, where a central controller (e.g., a PC controller) receives long-term channel statistics from a plurality of eNBs. Before proceeding to the step 820, the central controller may perform further processing on the long-term statistics. Next, the method 800 may proceed to step 820, where the central controller identifies likely scheduling scenarios based on the long-term channel statistics. A scheduling scenario may correspond to a traffic pattern or distribution of user requesting uplink resources at a given instance (or over a given period) in the wireless network. Thereafter, the method 800 may proceed to step 830, where the central controller may generate a set of potential interference patterns corresponding to the likely scheduling scenarios. In one embodiment, the potential interference patterns may be generated by simulating JPC/JS on each of the identified scheduling scenarios, thereby generating (or predicting) a resulting interference pattern for that scenario. In some embodiments, the potential interference patterns and/or common scheduling scenarios may be pre-defined (e.g., may be a priori information) by a network administrator or system designer. In such embodiments, the potential interference patterns and/or common scheduling scenarios would be retrieved from memory. Subsequently, the method 800 may proceed to step 840, where the central controller may utilize a statistical narrowing technique to shrink the potential interference patterns into one or more common interference patterns. In other words, the central controller may use statistical narrowing techniques (discussed in greater detail below) to remove certain interference patterns (e.g., uncommon interference patterns) and/or merge multiple interference patterns (e.g., redundant/correlated patterns) from the original set of potential interference patterns, thereby generating one or more common interference patterns. Next, the method 800 may proceed to step 850, where the central controller may send the one or more common interference patterns to the eNBs for utilization during distributed/localized PC and scheduling. In some embodiments, the method 800 may be performed statically, in which case the method 800 may end at step 850. In other embodiments, the method 800 may be performed semi-statically, in which case the method may revert to step 810 after a delay 860.

As discussed above, various statistical narrowing techniques may be used to shrink a set of potential interference patterns (e.g., IP-1, IP-2, ..., IP-N) into one or more common interference patterns. Such statistical narrowing techniques may use one or more of the following steps. One narrowing step may be to merge redundant and/or correlated interference patterns. During the merging process, ICI levels of two or more redundant/correlated interference patterns are combined to form a single interference pattern. In one embodiment, merging may be achieved by deleting/removing the less probable interference pattern without altering the ICI levels of the more probable interference pattern. In other embodiments, merging may be achieved by combining the corresponding ICI levels using their probabilities as weights, e.g., (a1*ICI1+a2*ICI2)/(a1+a2), where a1 and a2 are the probabilities of each interference pattern. Alternative techniques for merging interference patterns may also be used. Redundant interference patterns may be those patterns having identical ICI thresholds. Correlated interference patterns may be patterns that have similar ICI thresholds, e.g., IP-1 [$ICI_i(C_x)$]≈IP-2[$ICI_i(C_x)$], etc. In embodiments, interference patterns that are substantially correlated may be those having a Euclidian distance less than a threshold ($E_{th}$). For instance, a first interference pattern (IP-1) and a second interference pattern (IP-2) may be substantially correlated if their Euclidian distance (E(IP-1, IP-2)) is less than the Euclidian threshold (e.g., E(IP-1, IP-2)<$E_{th}$).

Another narrowing step may be to remove improbable interference patterns. Probability may be assigned based on the number of times a pattern was merged. For instance, assuming there are 500 potential interference patterns in the set of potential interference patterns, then each interference pattern (initially) has a probabilistic weight of about 0.2%. Hence, merging five redundant/correlated interference patterns into a single interference pattern will reduce the set of potential interference patterns to about 496, as well as allocate a probalistic weight to the merged interference pattern of about 1% (e.g., 0.2% multiplied by 5). Another narrowing step may be to rank the interference patterns (e.g., after merging) based on their probability, and (subsequently) merge less probable interference patterns. For instance, the more probable interference pattern may absorb the less probable interference patterns until enough improbable interference patterns have been culled. The narrowing techniques discussed herein may include one or more of the above discussed narrowing steps, as well as other steps.

In some embodiments, an alternative technique for finding a common interference pattern may be used. For example, the centralized scheme may find power patterns for N resource blocks by simulation or other means. Then, according to this example, a number of most probable (Np) patterns are selected for continued processing. Consequently, the remaining least probable patterns (e.g., N-Np patterns) are merged with those selected Np patterns. There are several ways to merge the N-Np patterns with the Np patterns. For instance, the lowest probable pattern from N-NP patterns may be merged with the most closely matching pattern in the selected group of N patterns, with the product of the two merged patterns being assigned a probability that is equal to the sum of the probabilities of the two merged patterns. Said merging process may be repeated until all the N-Np patterns are merged.

Thereafter, the selected Np patterns may be converted to a reduced number of patterns (e.g., Y patterns to be used in the repetitive cycle). This conversion may be achieved by finding integer numbers proportional to the probability of the pattern (or closer) where sum of the integer numbers is equal to Y and the smallest integer number is at least one. If in the process, this condition cannot be met (i.e. if the smallest integer number (rounded) is 0), the least probable pattern is merged to the closest pattern of the remaining patterns. Thereafter, the process is repeated until the integer number corresponds to the lowest probable pattern is at least one. After this process, each pattern is repeated by its allocated integer number creating exactly Y number of patterns (there may be some duplicated patterns). In order to obtain the best overall performance, it may be advantageous to spread out those duplicated patterns within the Y pattern.

The process for obtaining the common interference patterns may be modified to account for temporal fading and other factors. Specifically, temporal fading may refer to a variation in signal attenuation with respect to time, as may be attributable to the time-variant nature of channel characteristics (e.g., path loss floats due to multipath propagation, shadowing, etc.). Notably, temporal fading may cause the individual eNB-to-eNB interference components to fluctuate, which may cause the simulations used to obtain interference patterns to become unstable. To correct for this, a central controller may introduce up-fade margins (e.g., positive margins) and/or down-fade margins (e.g., negative margins) prior to interference pattern optimization (e.g., before narrowing the potential interference patterns into one or more common interference patterns). For instance, a set of X interference patterns (X is an integer) may be identified in accordance with long term channel statistics. Thereafter, the central controller may apply an up-fade margin to the set of X interference patterns to obtain a set of X up-fade adjusted interference patterns. Likewise, the central controller may apply a down-fade margin to the set of X interference patterns to obtain a set of X down-fade adjusted interference patterns. The three sets of interference patterns may be aggregated to form the superset of 3× potential interference patterns, which may thereafter be subjected to statistical narrowing techniques to obtain one or more common interference patterns. In some embodiments, multiple up-fade and/or down-fade margins may be used, to generate a larger superset of interference patterns. For instance, two up-fade margins (e.g., a larger one and a smaller one) and two down-fade margins (e.g., a larger one and a smaller one) may be applied to a set of X interference patterns to generate a superset of 5× potential interference patterns.

Figure 9:
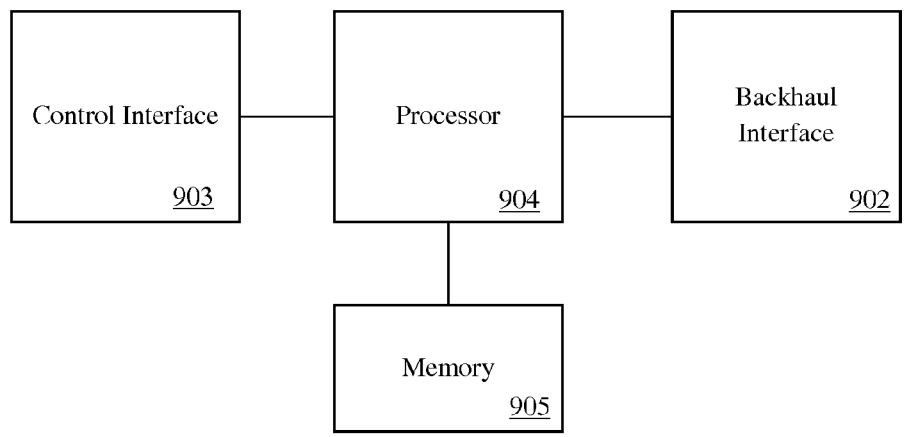
FIG. 9 illustrates a block diagram of an embodiment of a PC controller.

FIG. 9 illustrates a block diagram of an embodiment PC controller 900. The PC controller 900 may include a backhaul interface 902, a control interface 903, a processor 904, and a memory 905, which may be arranged as shown in FIG. 9. The backhaul interface 902 may be any component or collection of components that allows the PC controller 900 to engage in network communications with another device, e.g., an eNB, another PC controller, etc. The control interface 903 may be any component or collection of components that allows the PC controller 900 to engage in network communications with a network administrator. The processor 904 may be any component capable of performing computations and/or other processing related tasks, and the memory 905 may be any component capable of storing programming and/or instructions for the processor.

Figure 10:
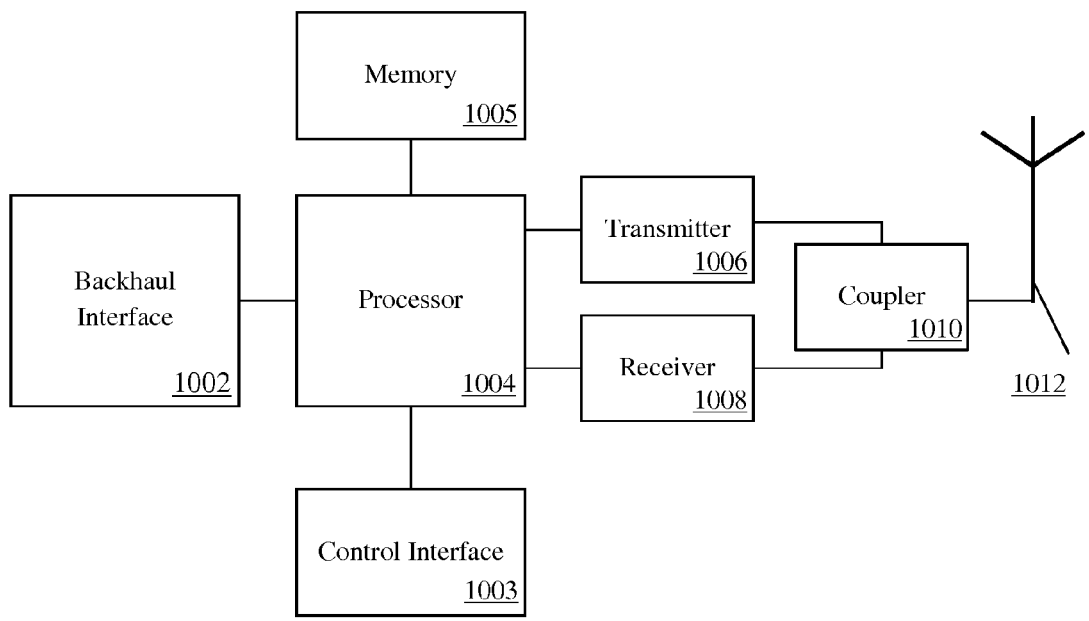
FIG. 10 illustrates a block diagram of an embodiment of an eNB.

FIG. 10 illustrates a block diagram of an eNB 1000. The eNB 1000 may include a backhaul interface 1002, a control interface 1003, a processor 1004, a memory 1005, a transmitter 1006, a receiver 1008, a coupler 1010, and an antenna 1012, which may be arranged as shown in FIG. 10. The backhaul interface 1002 may be any component or collection of components that allows the eNB 1000 to engage in network communications with another device, e.g., other eNBs, a PC controller, etc. The control interface 1003 may be any component or collection of components that allows the eNB 1000 to engage in network communications with a network administrator. The processor 1004 may be any component capable of performing computations and/or other processing related tasks, and the memory 1005 may be any component capable of storing programming and/or instructions for the processor. The transmitter 1006 may be any component capable of transmitting a signal, while the receiver 1008 may be any component capable of receiving a signal. The coupler 1010 may be any component capable of isolating a transmission signal from a reception signal, such as a duplexer. The antenna 1012 may be any component capable of emitting and/or receiving a wireless signal. In an embodiment, the eNB 1000 may be configured to operate in a long term evolution (LTE) network using an OFDMA downlink channel divided into multiple subbands or subcarriers and using SC-FDMA in the downlink. In alternative embodiments, other systems, network types and transmission schemes can be used, for example, 1XEV-DO, IEEE 802.11, IEEE 802.15 and IEEE 802.16, etc.

Embodiments of this disclosure may be applicable to various coordinated multipoint (COMP) schemes and/or interference cancellation schemes, and be modified to incorporate beamforming.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for facilitating uplink power control (PC) and scheduling in a wireless network, the method comprising:
    obtaining a plurality of potential interference patterns between a plurality of neighboring cells, wherein each of the plurality of potential interference patterns specify a different set of inter-cell-interference (ICI) thresholds for constraining scheduled transmissions in the plurality of neighboring cells;
    statistically narrowing the plurality of potential interference patterns into one or more common interference patterns, wherein statistically narrowing the plurality of interference patterns includes removing at least some potential interference patterns from the plurality of potential interference patterns; and
    sending the one or more common interference patterns to a first base station (eNB) in a first one of the plurality of neighboring cells, thereby triggering the first eNB to perform localized PC and to perform scheduling in the first neighboring cell in accordance with the one or more common interference patterns.

2. The method of claim 1, wherein obtaining the plurality of potential interference patterns comprises:
    receiving, by a controller, channel statistics corresponding to the plurality of neighboring cells in the wireless network; and
    generating the plurality of potential interference patterns in accordance with the channel statistics.

3. The method of claim 2, wherein generating the plurality of potential interference patterns comprises:
    identifying a plurality of potential scheduling scenarios in accordance with the channel statistics;
    simulating joint power control (JPC) and joint scheduling (JS) for each of the potential scheduling scenarios; and
    obtaining the plurality of potential interference patterns by estimating levels of interference that would result from the simulated JPC and JS.

4. The method of claim 3, wherein obtaining the plurality of potential interference patterns by estimating levels of interference that would result from the simulated JPC and JS comprises:
    generating a first set of interference patterns according to the estimated levels of interference that would result from the simulated JPC and JS;
    generating a second set of interference patterns by adjusting the estimated levels of interference by fading margins; and
    identifying the plurality of potential interference patterns as including both the first set of interference patterns and the second set of interference patterns.

5. The method of claim 4, wherein the fading margins are interference channel dependent and are determined in accordance with fading statistics provided by a plurality of eNbs in the wireless network.

6. The method of claim 1, wherein each of the one or more common interference patterns specifies a plurality of ICI thresholds.

7. The method of claim 6, wherein the plurality of ICI thresholds includes a plurality of individual eNB-to-eNB interference thresholds corresponding to the first eNB, and
    wherein each one of the plurality of individual eNB-to-eNB interference thresholds specifies a maximum amount of interference to be produced in a corresponding one of the plurality neighboring cells as a result of an uplink transmission in the first neighboring cell.

8. The method of claim 6, wherein the plurality of ICI thresholds include a plurality of total interference thresholds, wherein each of the plurality of total interference thresholds specifies a maximum amount of interference to be produced in a corresponding one of the plurality of neighboring cells as a result of uplink transmissions in each of the other neighboring cells.

9. The method of claim 1, wherein statistically narrowing the plurality of potential of interference patterns comprises:
merging correlated ones of the plurality of interference patterns with one another to generate a non-homogenous set of interference patterns.

10. The method of claim 9, wherein statistically narrowing the plurality of potential of interference patterns further comprises:
assigning probabilities to each interference pattern in the non-homogenous set of interference patterns in accordance with a number of interference patterns that were merged to obtain that particular interference pattern; and
selecting the one or more common interference patterns from the non-homogenous set of interference patterns in accordance with the assigned probabilities.

11. The method of claim 1, wherein the first eNB performs Modulation Coding Scheme (MCS) adaptation in conjunction with the localized PC and scheduling.

12. An apparatus for facilitating uplink power control (PC) and scheduling in a wireless network, the apparatus comprising:
a processor; and
a non-transitory computer readable storage medium storing programming for execution by the processor, the programming including instructions to:
obtain a plurality of potential interference patterns between a plurality of neighboring cells, wherein each of the plurality of potential interference patterns specify a different set of inter-cell-interference (ICI) thresholds for constraining scheduled transmissions in the plurality of neighboring cells;
statistically narrow the plurality of potential of interference patterns into one or more common interference patterns, wherein the instructions to statistically narrow the plurality of interference patterns into the one or more common interference patterns includes instructions to remove at least some potential interference patterns from the plurality of potential interference patterns; and
send the one or more common interference patterns to the plurality of base stations (eNBs), thereby triggering each of the plurality of eNBs to perform both localized PC an scheduling in accordance with the one or more common interference patterns.

13. The apparatus of claim 12, wherein each of the one or more common interference patterns specifies a plurality of ICI thresholds.

14. The apparatus of claim 13, wherein the plurality of ICI thresholds includes a plurality of individual eNB-to-eNB interference thresholds corresponding to a first eNBs providing wireless access in an instant cell, and
wherein each one of the plurality of individual eNB-to-eNB interference thresholds specifies a maximum amount of interference to be produced in a corresponding one of a plurality neighboring cells as a result of an uplink transmission in the instant cell.

15. The apparatus of claim 13, wherein the plurality of ICI thresholds include a plurality of total interference thresholds, wherein each of the plurality of total interference thresholds specify a maximum amount of interference to be produced in a corresponding one of the plurality of neighboring cells as a result of uplink transmissions in each of the other neighboring cells.

16. The apparatus of claim 12, wherein the instructions to obtain the plurality of interference patterns includes instructions to:
receive channel statistics corresponding to a plurality of neighboring cells each of which being serviced by one of the plurality of eNBs; and
generate the plurality of potential interference patterns in accordance with the channel statistics.

17. The apparatus of claim 16, wherein the instructions to generate the plurality of potential interference patterns includes instructions to:
identify a plurality of potential scheduling scenarios in accordance with the channel statistics;
simulate joint power control (JPC) and joint scheduling (JS) for each of the potential scheduling scenarios; and
obtain the plurality of potential interference patterns by estimating levels of interference that would result from the simulated JPC and JS.

18. A base station (eNB) in a first cell of a wireless network, the eNB comprising:
a processor; and
a non-transitory computer readable storage medium storing programming for execution by the processor, the programming including instructions to:
receive a common interference pattern from a central controller;
identify a plurality of individual eNB-to-eNB interference thresholds in accordance with the common interference pattern, wherein the common interference pattern specifies a plurality of total interference thresholds each of which indicating a total amount of interference to be produced in a corresponding one of the plurality of neighboring cells, and wherein the instructions to identify a plurality of individual eNB-to-eNB interference thresholds include instructions to reduce each of the plurality of total interference thresholds by a margin; and
schedule an uplink transmission by a candidate user equipment (UE) in the first cell in accordance with the plurality of individual eNB-to-eNB interference thresholds.

19. The eNB of claim 18, wherein each of the plurality of individual eNB-to-eNB interference thresholds specifies a maximum amount of interference to be produced in a corresponding one of a plurality of neighboring cells as a result of uplink communications in the first cell.

20. The eNB of claim 18, wherein the margin is fixed at six decibels (dBs).

21. The eNB of claim 18, wherein the margin is variable.

22. The eNB of claim 21, wherein the instructions to reduce each of the plurality of total interference thresholds by a margin include instructions to:
adjust the margin in accordance with a proximity of the first cell to a corresponding neighboring cell.

23. The eNB of claim 21, wherein the instructions to reduce each of the plurality of total interference thresholds by a margin include instructions to:
adjust the margin in accordance with a detected temporal fading characteristic.

24. A base station (eNB) in a first cell of a wireless network, the eNB comprising:

a processor; and a non-transitory computer readable storage medium storing programming for execution by the processor, the programming including instructions to:

receive a common interference pattern from a central controller;

identify a plurality of individual eNB-to-eNB interference thresholds in accordance with the common interference pattern, wherein each of the plurality of individual eNB-to-eNB interference thresholds specifies a maximum amount of interference to be produced in a corresponding one of a plurality of neighboring cells as a result of uplink communications in the first cell; and schedule an uplink transmission by a candidate user equipment (UE) in the first cell in accordance with the plurality of individual eNB-to-eNB interference thresholds, wherein the instructions to schedule an uplink transmission by a candidate UE in accordance with the plurality of individual eNB-to-eNB interference thresholds includes instructions to identify the candidate UE to predict a plurality of estimated interference levels that would be produced in the plurality of neighboring cells as a result of a corresponding uplink transmission by the candidate UE and to verify that the estimated interference levels would not exceed the maximum amounts of interference specified by the individual eNB-to-eNB interference thresholds.

25. The eNB of claim 24, wherein the instructions to predict the plurality of estimated interference levels includes instructions to:

identify a plurality of path loss values associated with the candidate UE, wherein each of the path loss values specify signal attenuation between the scheduled UE and a corresponding eNB in a unique one of the plurality of neighboring cells;

estimate a transmit power level associated with the uplink transmission; and predict the plurality of estimated interference levels in accordance with the path loss values and the transmit power level associated with the uplink transmission.

26. The eNB of claim 24, wherein the plurality of individual eNB-to-eNB interference thresholds are specified by the common interference pattern.

* * * * *